(12) United States Patent
Hodjat et al.

(10) Patent No.: US 10,364,375 B2
(45) Date of Patent: Jul. 30, 2019

(54) ARTICLE WITH SELF-BONDING FULLY CURED ELASTOMER

(75) Inventors: Yahya Hodjat, Oxford, MI (US); Yuding Feng, Rochester Hills, MI (US)

(73) Assignee: Gates Corporation, Denver, CO (US)

( * ) Notice: Subject to any disclaimer, the term of this patent is extended or adjusted under 35 U.S.C. 154(b) by 1187 days.

(21) Appl. No.: 12/815,241

(22) Filed: Jun. 14, 2010

(65) Prior Publication Data

US 2011/0305910 A1 Dec. 15, 2011

(51) Int. Cl.
*C09J 5/00* (2006.01)
*C09J 7/00* (2018.01)
*C08K 5/00* (2006.01)
C08K 5/057 (2006.01)

(52) U.S. Cl.
CPC .............. *C09J 7/00* (2013.01); *C08K 5/0091* (2013.01); *C09J 5/00* (2013.01); *C08K 5/057* (2013.01); *C09J 2205/102* (2013.01); *C09J 2400/163* (2013.01); *C09J 2421/00* (2013.01); *Y10T 428/31504* (2015.04); *Y10T 428/31681* (2015.04); *Y10T 428/31721* (2015.04)

(58) Field of Classification Search
CPC combination set(s) only.
See application file for complete search history.

(56) References Cited

U.S. PATENT DOCUMENTS

| 2,409,759 | A | 10/1946 | Hosking |
| 3,903,332 | A | 9/1975 | Kelly et al. |
| 4,623,738 | A | 11/1986 | Sugerman et al. |
| 4,764,632 | A | 8/1988 | Cohen |
| 5,021,519 | A | 6/1991 | Varde et al. |
| 5,116,939 | A | 5/1992 | Fletcher et al. |
| 5,126,205 | A | 6/1992 | Chon et al. |
| 5,378,539 | A * | 1/1995 | Chen ............................ 428/378 |
| 5,659,058 | A | 8/1997 | Monte |
| 6,333,086 | B1 | 12/2001 | Ora et al. |
| 6,417,286 | B1 | 7/2002 | Agostini et al. |
| 6,870,064 | B2 | 3/2005 | Agostini et al. |
| 7,291,241 | B2 | 11/2007 | Dunlap |
| 7,384,028 | B2 | 6/2008 | Sugiura et al. |

(Continued)

FOREIGN PATENT DOCUMENTS

| EP | 0639621 A2 | 2/1995 |
| EP | 2277883 A2 | 1/2011 |

(Continued)

OTHER PUBLICATIONS

Kenrich Petrochemicals, Inc., "Product Data Sheet, PDS CAPOW NZ12/H Jan. 28, 2004," 2 pages.

(Continued)

*Primary Examiner* — Samir Shah
(74) *Attorney, Agent, or Firm* — Paul N. Dunlap, Esq.; Jeffrey A. Thurnau, Esq.

(57) ABSTRACT

A rubber-metal bonded article with an adhesion promoter in the rubber selected from neoalkoxy zirconates and polyimides. Articles requiring compressed rubber exhibit improved retention of compressive strain after assembly of the article and activation of the adhesion promoter. Also claimed is a method wherein a rubber composition may be fully cured, then assembled between two substrates under compression, then the adhesion promoter activated to form the bond.

30 Claims, 2 Drawing Sheets

(56) References Cited

U.S. PATENT DOCUMENTS

| | | |
|---|---|---|
| 7,449,523 B2 | 11/2008 | Park |
| 7,658,387 B2 | 2/2010 | Park |
| 2001/0032764 A1* | 10/2001 | Hasegawa et al. ............ 188/378 |
| 2004/0087721 A1* | 5/2004 | Bruhn .................. C08L 23/0869 525/132 |
| 2005/0143512 A1 | 6/2005 | Bryant |
| 2006/0223927 A1 | 10/2006 | Hodjat |
| 2009/0036609 A1* | 2/2009 | Feng et al. .................... 525/220 |
| 2009/0203812 A1 | 8/2009 | Rao et al. |

FOREIGN PATENT DOCUMENTS

| | | |
|---|---|---|
| GB | 2214512 A | 9/1989 |
| WO | 2006107418 A1 | 10/2006 |
| WO | 2007084564 A2 | 7/2007 |
| WO | 2010-127101 A1 | 4/2010 |

OTHER PUBLICATIONS

Brian D. Stull, "Performance Characteristics of Rubber-to-Substrate Adhesive and Coatings", Rubber World, Apr. 2010, pp. 18-20.

* cited by examiner

ARTICLE WITH SELF-BONDING FULLY CURED ELASTOMER

BACKGROUND OF THE INVENTION

Field of the Invention

This invention relates generally to rubber-metal bonded articles and methods, more particularly to such articles with a self-bonding rubber composition comprising an adhesion promoter selected from a neoalkoxy phosphato zirconate and a polyimide, and specifically to a composition that can be fully cured and formed at one temperature, then the adhesive activated at a higher temperature with minimal further effect on the state of cure.

Description of the Prior Art

Bonding of elastomers to metals is a common practice with many industrial applications. The most common way of metal-elastomer bonding is to use various adhesives, according to various techniques known in the industry. This practice usually involves many preparatory steps for the surfaces involved to ensure adequate bonding. The use of adhesives can involve vulcanization bonding or post-vulcanization bonding.

In rubber-metal composite parts intended for dynamic applications, an important goal is often to maintain the elastomer member in a state of compression between two metal parts in order to ensure good fatigue life. In this case, post-vulcanization bonding is preferred in order to avoid the effect of thermal shrinkage after vulcanization of the elastomer.

Various attempts to reduce the use of adhesives have been made. So-called self-bonding elastomers which bond directly to metal upon vulcanization in the absence of any separate adhesive are known. Generally these elastomers bond specifically to particular metals, such as the elastomer compositions with various cobalt compounds which bond specifically to brass. When self-bonding elastomers are applied in a vulcanization-bonding process, thermal shrinkage may put the elastomer into a state of tension between metal parts.

Sometimes it is advantageous to form the elastomer member in one operation and bond it to the metal members in a separate step, maybe in a separate part of the factory. U.S. Pat. No. 2,409,759 to Hosking, which is hereby incorporated herein by reference in its entirety, teaches a method wherein a partially or fully cured elastomer part is bonded to cuprous metal by confining the elastomer and the metal parts in a second mold and applying heat and hydrostatic pressure sufficient to bond the elastomer to the metal. The cuprous alloy must be polished and the elastomer must contain chemically pure zinc oxide. This method may only partially resolve the shrinkage issue. At best the elastomer element will be in a neutral state upon removal from the confining mold.

A method involving two cure steps is taught by U.S. Pat. No. 7,291,241 to Dunlap, which is hereby incorporated herein by reference in its entirety. The elastomer member is formed first in a shape-forming mold. The partially cured elastomer member is then assembled in a rubber-metal part under compression between two metal members and the vulcanization is completed to effect a bond between rubber and metal. Various coagents for peroxide cured rubber are suggested as effective adhesion promoters. This method partially resolves the shrinkage issue. The rubber element remains in a state of compression after the second cure step.

Since the stress state of an elastomer is an extremely important factor in its durability and also a major contributing factor in its bonding to metal parts, there is a need for high-compression, self-bonding elastomers. Such an elastomer should have a high retained compression and should not need any separate adhesives for bonding to metals.

Co-pending U.S. patent application Ser. No. 12/340,864 filed Dec. 22, 2008, which is hereby incorporated herein by reference in its entirety, is directed to another method of improving the state of compression in a metal-rubber composite article.

SUMMARY

The present invention is directed to systems and methods which provide high retained compression in a self-bonding elastomer member in a metal-elastomer part in the absence of rubber-metal adhesive coatings and which can provide a process with more robust production, lower cost, and lower scrap than conventional methods.

The present invention is directed to a composite article comprising at least one structural member and an elastomer member residing in contact with and bonded to the structural member; the elastomer comprising 100 parts by weight of at least one elastomeric polymer component, and from 3 to 50 parts of at least one adhesion promoter selected from the group consisting of neoalkoxy zirconates and polyimides.

The neoalkoxy zirconate may be neopentyl-diallyl-oxy tri-dioctylphosphato zirconate. The elastomer may also include silicon dioxide in an amount equal to 40% to 60%, or about half, of the amount of adhesion promoter.

In an embodiment of the invention, the article has at least two structural members, and the elastomer member resides between two structural members and is bonded to at least one of the structural members in the absence of an adhesive coating between the elastomer member and the structural member. The elastomer may reside in a state of compression between two structural members. The structural members may be metal, and the adhesion promoter may be a metal adhesion promoter. The metal may be ferrous metal.

According to an embodiment of the invention, the article may be in the form of a vibration damper, vibration absorber or vibration isolator.

According to an embodiment of the invention, the elastomer includes a metal-adhesive ingredient which is preferably unreactive at the normal cure temperature of the elastomer, but which can be activated after vulcanization to effect a strong bond with a metal surface, preferably without affecting the crosslinked network of the cured elastomer. Activation may be by heat, radiation, or other means which preferably does not substantially affect the primary elastomer network formed during vulcanization.

The invention is also directed to a method including the steps:

(a) mixing an elastomer composition having 100 parts by weight of at least one elastomeric polymer component, and 3 to 50 parts of at least one adhesion promoter selected from the group consisting of neoalkoxy zirconates and polyimides;

(b) forming an at least partially cured elastomer element from the elastomer composition;

(c) press fitting the formed elastomer element between two rigid members so that the elastomer element resides in a state of compression in the absence of an external force; and (d) activating the adhesion promoter to form a bond between the elastomer element and at least one rigid member; whereby the elastomer element continues to reside in a state of compression.

In one embodiment of the method, forming involves substantially fully curing the elastomer element. Activating results in a bond between the elastomer element and two rigid members in the absence of any adhesive coating between the elastomer and members. The adhesion promoter may be a neoalkoxy zirconate with an organo-phosphate group, such as neopentyl-diallyl-oxy tri-dioctylphosphato zirconate.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

In one embodiment, the present invention is directed to a method of making a composite article, aspects of which are illustrated in the three diagrams of FIG. 1. The method includes providing an elastomeric composition with an adhesion promoter having an activation temperature higher than the cure temperature of the composition. The composition is formed by conventional means and cured or crosslinked at a reaction temperature which is preferably below the adhesion promoter's activation temperature into an elastomeric member which is substantially fully cured. By "substantially fully cured" is meant the elastomer is crosslinked to the desired state for full functionality in the intended final use. It is understood that there could be small amounts of additional crosslink formation or marching modulus effects over time, or the like, occurring in the elastomer. Preferably, the substantially fully cured elastomer, if cured for example with peroxide, has less than 1% residual reactive peroxide, i.e. is 99% to 100% cured based on peroxide consumed. Cure state can also be estimated by one of various cure meters and rheometers, cure-dependent physical properties, swelling, and/or other methods known in the rubber arts.

Thus, the invention relates to a self-bonding, fully cured elastomer composition and articles made therefrom. By "self-bonding" is meant the composition is capable of adhering directly to substrates, preferably rigid substrates, such as metals, structural plastics, reinforced composites, or the like, without the need for other adhesives or adhesive coatings on the substrates or between the elastomer and the substrate. Prior self-bonding elastomers bond during curing or vulcanizing, whereas the inventive compositions bond in a separate activation step after the elastomer is fully cured. Preferred embodiments bond well to ferrous metals, and often do not require any particular surface preparation, such as cleaning, polishing, roughening, brass coating, phosphatizing, adhesive layers, or the like.

Figure 1A:
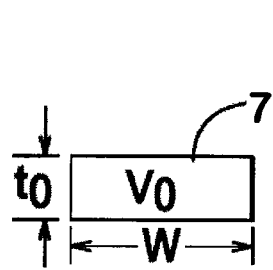
FIG. 1 is a sectional view illustrating aspects of an embodiment of the invention.
Figure 1B:
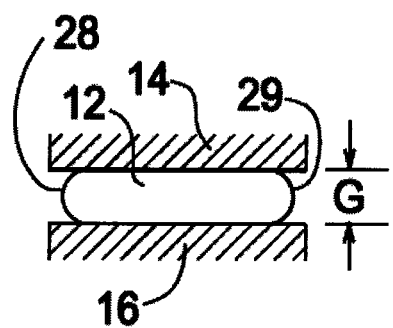

In FIG. 1a, elastomeric member 7 has thickness $t_0$, width w, and volume $V_0$. The method includes providing at least one structural member defining a fixed gap. In FIG. 1b, upper structural member 14 and lower structural member 16 define a fixed gap of separation distance G. The thickness $t_0$ of elastomeric member 7 is preferably larger than gap distance G. The elastomeric member is assembled into the gap with thickness dimension aligned with the gap, which results in elastomeric member 12 in an initial state of uniaxial compression in the gap. Herein the term "compression" generally means uniaxial compression, unless otherwise qualified. The initial state of compression is preferably defined as the percent deflection in the thickness direction and calculated as $(1-G/t_0)$. Compressing the thickness of member 12 results in an increased width and may cause the edges 28 and 29 to bulge.

After assembly, the adhesion promoter is activated, for example by heat, resulting in bonding between elastomeric member 12 and one or both structural members 14 and 16, but resulting in minimal if any additional crosslinking, stress relaxation, or creep of the elastomer member. Because the elastomer member is already fully cured, the activation step does not result in a significant loss in compression stress or spring-back. This is a distinct advantage over the two-step cure approach of U.S. Pat. No. 7,291,241.

Figure 1C:
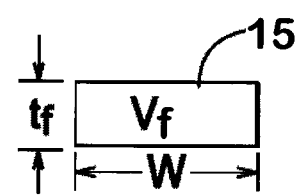

The pressure exerted between elastomeric member 12 and structural members 14 and 16 at the relevant surfaces is particularly advantageous for improving the elastomer's resistance to crack growth, flex fatigue, or the like. FIG. 1c illustrates how the elastomeric member may appear if subsequently removed from the gap. Elastomeric member 12 after removal becomes relaxed elastomeric member 15 which now has relaxed thickness $t_f$ and relaxed volume $V_f$. The swell ratio $t_f/G$ gives an indication of the amount of linear "spring-back" and provides an indication of the amount of pressure that had been exerted by the compressed elastomeric element on the structural elements. The percent linear spring-back (also called percent swell) may be indicated by the quantity $(t_f/G-1)$. Likewise, the volumetric spring-back ratio $V_f/V_0$ or the percent volumetric expansion $(V_f/V_0-1)$ may be useful measures to characterize the amount of spring-back and/or the state of compression of the elastomeric element within the final assembly.

It should be understood that the ratios and measures described above for characterizing the compression and/or spring-back of the elastomeric element may include or be confounded with other effects such as creep, relaxation, compression set, or the like. Because of such effects, $t_f$ is generally less than $t_0$. In other words, the state of compression after activation is generally less than the initial state of compression. Nevertheless, these measures provide a practical indication of the advantageous effects of the invention. For example, torsional vibration dampers made according to the two-step cure method disclosed in U.S. Pat. No. 7,291,241, utilizing reactive coagents as the adhesion promoter and partial cure in the first step, might typically have an initial compression of 25 to 30% and only exhibit linear spring-back of about 8 to 12%. Similar dampers made according to an embodiment of the present invention have exhibited linear spring-back of about 20%, a two-fold improvement in the state of compression.

Figure 2:
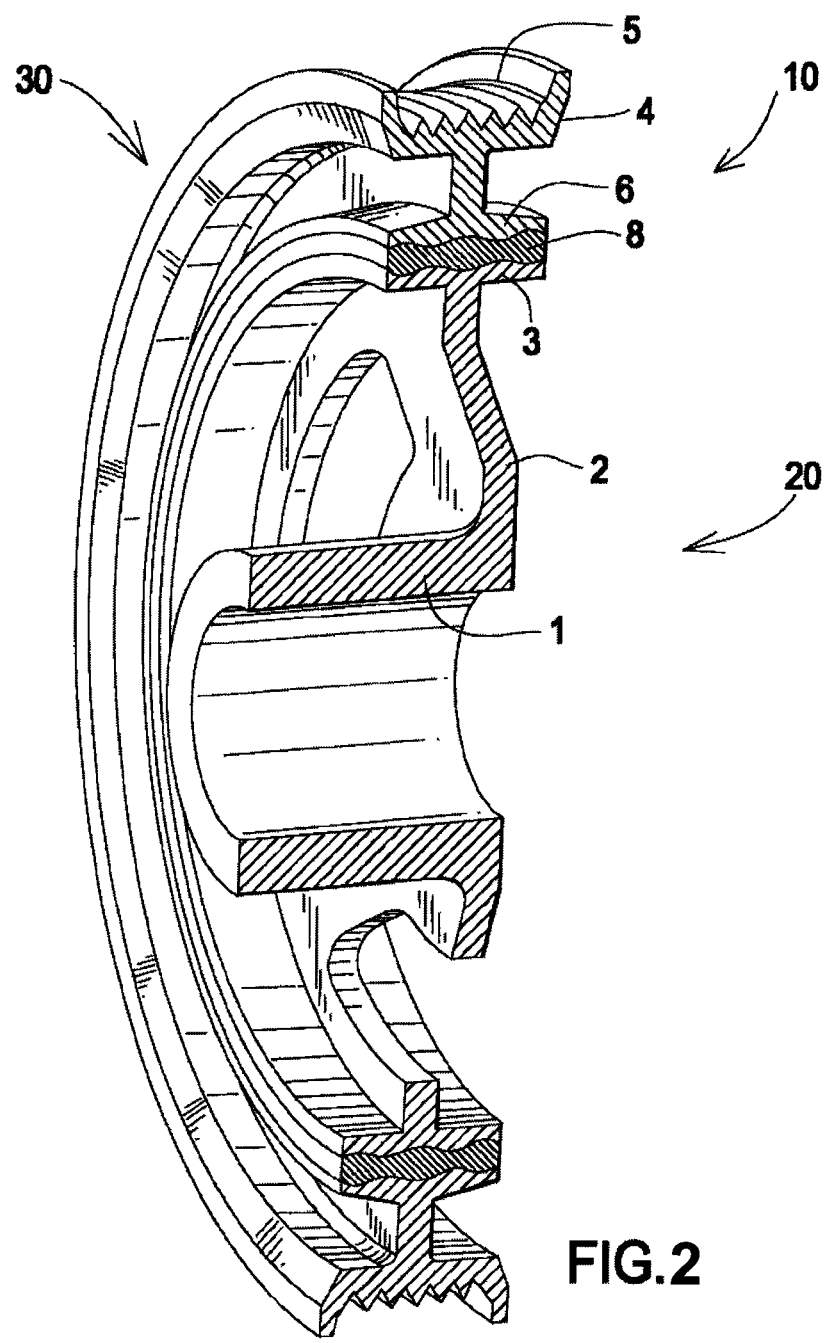
FIG. 2 is a partially fragmented perspective view of an embodiment of the invention.

Although the subject invention can be applied to all elastomer-metal bonded parts, as a nonlimiting example, the bonding of elastomer to crankshaft damper metal parts is described herein. In such an application, a round, molded elastomer ring is pressed between two metal rings, i.e., a hub and a pulley, with a given distance between them. Referring to FIG. 2, dual ring damper 10 comprises inner ring 20 and inertial outer ring 30 and sandwiched elastomeric ring 8. Inner ring 20 comprises hub 1 and web 2 and rim 3. Hub 1 is sized to attach to a shaft (not shown, but conventional) such as a crankshaft. The configuration shown in FIG. 2 is for a press fit of hub 1 to a shaft, although a flange, or keyway, or other arrangement known in the art may also be used to secure the hub to a receiving shaft. Inertial outer ring 30 comprises rim 6 and belt receiving portion 4. Belt receiving portion 4 may comprise any belt profile known in the art including profile 5 for a multi-V-ribbed belt as shown.

Rims 3, 6 describe an annular space having a gap between them. Rims 3, 6 may be flat. Alternatively, rims 3, 6 may each have a complex shape that allows the elastomeric ring 8 to be mechanically fixed in the annular space as show in FIG. 2. Generally, rims 3, 6 may be coated with any of the rubber-to-metal adhesives known in the art to facilitate bonding of the elastomeric ring 8 to the rim surfaces. Alternatively, the elastomeric ring 8 may reside in the annular gap under compression relying on friction forces alone to prevent slippage between the elastomeric ring 8 and the rims 3, 6. Rims 3, 6 may comprise knobs, surface roughness, or any other form of random surface irregularity or friction producing form. Preferably, rims 3, 6 are free of any adhesive coating and the elastomeric ring, according to an embodiment of the invention, is directly bonded to the metal rims through activation of the adhesion promoter in the elastomer composition.

The self-bonding, fully cured elastomers of the present invention are made by mixing special adhesion-promoting ingredients into the elastomer mix. Such additives are preferably not active at the molding temperature of the elastomer. Therefore, an elastomer shape can be formed and fully cured with an adhesion promoter present in the mix. These additives can be designed and mixed in the elastomer to be either heat or chemical (or other means) activated. Upon activation, the adhesion promoter creates a strong bond with the metals or other substrates in contact with the elastomer shape. The heat can be applied to the entire elastomer by putting the entire part in an oven, or just on the surface by assembling the cold elastomer in hot metal parts. Heat can also be introduced by vibration, radiation, or a wave-induced process such as micro wave, electron beam, radio frequency wave, infra red, and the like.

Once the adhesion-promoting additives are exposed to heat or other activating energy, they can react, melt, soften, or explode, at least at the surface of the elastomer. The adhesion-promoter inside the body of the elastomer could remain unchanged by using surface activation (e.g. surface heating) only, or the adhesion promoter throughout the elastomeric member can also be activated. If the additives inside the rubber part are also activated, they should be designed to either not create harm to the integrity of the elastomer, or to further enhance its properties. In particular, it is advantageous if additional crosslinking or rearrangements of crosslinks are not caused, to minimize compression set or relaxation during activation. It may also be advantageous if activation results in creating internal micro or nano gaseous expansion pressure as described in U.S. patent application Ser. No. 12/340,864 filed Dec. 22, 2008, which is hereby incorporated herein by reference in its entirety. Such expansion pressure can increase the compressive forces in a rubber-metal part, resulting in improved fatigue resistance. Such an effect can be in addition to the improved compression from the embodiment of the invention described above and represents another embodiment of the invention. Expansion can be achieved by adding a foaming agent or blowing agent or chemical that decomposes to release a gas. It may also be advantageous if an effect of the activation reaction or reactions is to add to the internal chemical bonding strength or tear strength of the elastomer material.

According to an embodiment of the invention, the adhesive promoter may be an organometallic phosphoric compound such as represented by the neoalkoxy zirconates and titanates disclosed by U.S. Pat. No. 4,623,738, which is hereby incorporated herein by reference in its entirety. Thus, the adhesion promoter may be an organometallic compound represented by the following general formula:

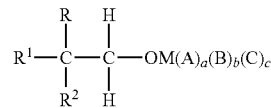

wherein M is titanium or zirconium, R, $R^1$ and $R^2$ are each a monovalent alkyl, alkenyl, alkynyl, aralkyl, aryl or alkaryl group having up to 20 carbon atoms or a halogen or ether substituted derivative thereof, and, in addition, $R^2$ may also be an oxy derivative of said groups. The various R, $R^1$ and $R^2$ may each contain up to three ether oxygen or halogen substituents, provided the total number of carbon atoms for each such R group does not exceed 20, inclusive of the carbon atoms contained in substituent portions. A, B and C may be an aroxy (ArO—), thioaroxy (ArS—), diester phosphate (($R^3$O)($R^4$O)P(O)O—), diester pyrophosphate (($R^3$O)($R^4$O)P(O)OP(O)), oxyalkylamino ($R^5R^6NR^7$O—), sulfonyl (ArS(O)$_2$O—), or carboxyl (RC(O)O—). Each group may contain up to 30 carbon atoms.

Ar, in the above formulas, may be a monovalent aryl or alkaryl group having from 6 to about 20 carbon atoms, optionally containing up to 3 ether oxygen substituents, and substituted derivatives thereof wherein the substitutions are up to a total of three halogens or amino groups having the formula $NR^8R^9$ wherein $R^8$ and $R^9$ are each hydrogen, an alkyl group having 1 to 12 carbon atoms, an alkenyl group having from 2 to 8 carbon atoms, a cycloalkyl group having from 3 to 12 carbon atoms, and an aryl group having from 6 to 12 carbon atoms; and $R^3$ and $R^4$ may each be the same group as R, $R^1$ and Ar. $R^5$ and $R^6$ may be hydrogen, an alkyl or aminoalkyl group having from 1 to 15 carbon atoms and $R^7$ may be an alkylene group having from 1 to 6 carbon atoms or an arylene group having from 6 to 10 carbon atoms or a combination thereof; and a+b+c is equal to 3. Thus, a wide variety of ligands may be used in the practice of the invention. The most suitable for a particular application may depend upon the elastomer compound employed, the substrate material, and on the other ingredients introduced into the formulation.

In a preferred embodiment, the adhesion promoter is an organo-zirconate having the above formula, in which M is zirconium, R, $R^1$ and $R^2$ are each a monovalent alkyl, alkenyl, alkynyl, aralkyl, aryl or alkaryl group having up to 20 carbon atoms, or a halogen or ether substituted derivative thereof, and, in addition, $R^2$ may also be an oxy derivative or an ether substituted oxy derivative of said groups; A, B and C are each a monovalent aroxy, thioaroxy, diester phosphate, diester pyrophosphate, oxyalkylamino, sulfonyl or carboxyl; and a+b+c=3.

A preferred adhesion promoter is a neoalkoxy zirconate diester phosphate. Exemplary promoters include neopentyl (diallyl)oxy tri(dioctyl)phosphate zirconate, neopentyl(diallyloxy) tri(dioctyl)pyrophosphate zirconate, isopropyl tri (dioctylpyrophosphate)zirconate, isopropyl tri (dioctylphosphate)zirconate, di(dioctylpyrophosphate) oxyacetatezirconate, di(dioctylphosphate) oxyacetatezirconate, di(dioctylpyrophosphate) ethylenezirconate, di(dioctylphosphate)ethylenezirconate, tri(butyl-octyl pyrophosphate)ethylenezirconate, and/or tri (butyl-octyl phosphate)ethylenezirconate. A preferred adhesion promoter is neopentyl(diallyl)oxy tri(dioctyl)phosphato zirconate which is available under the trademark KENREACT® CAPOW® NZ® 12/H from Kenrich Petrochemicals, Inc. More specifically, CAPOW® NZ® 12/H contains 65 wt. % of a neoalkoxy phosphato zirconate (i.e., neopentyl (diallyl)oxy tri(dioctyl)phosphato zirconate) dispersed on 35 wt. % silica.

In another embodiment, the adhesion promoter is a polyimide powder. U.S. Pat. No. 5,116,939 discloses that polyimide powder may be used as an example of a reinforcing powder filler in dynamically vulcanized thermoplastic elastomers or a thermoplastic vulcanizate (TPV), and the contents thereof regarding useful types of polyimides are hereby incorporated herein by reference. U.S. Pat. No. 7,449,523 discloses that polyimide powder may be used as thermoplastic additives for wear resistance in TPV. U.S. Pat. No. 7,658,387 discloses use of polyimide powder as a reinforcing filler or hydrocarbon elastomer wear additive in processable rubber compositions.

Polyimide powders useful in embodiments of the invention include various grades of polyimide powder available under the VTEC mark from RBI, Inc. VTEC powder grades are available with various fillers and enhancers include glass, graphite, carbon, PTFE, $MoS_2$, minerals, etc. An unfilled grade of polyimide powder is preferred.

Other useful grades of polyimide powder are available under the mark P84® NT from Evonik Industries. Other useful examples of polyimide fine powders are available under the AURUM mark, including AURUM PD400 and PD450, from Mitsui and Company Ltd. AURUM PD400 and 450 polyimide powders from Mitsui Chemicals Inc. have a mean particle size range as low as 6 micron.

In another embodiment, the compositions may be advantageously used in the two-step cure method of U.S. Pat. No. 7,291,241 to Dunlap, which is hereby incorporated herein by reference in its entirety. Thus, an uncured elastomer composition according to the present invention may be placed into a shape-forming mold and cured in at least two stages, wherein in a first curing stage the composition is less than fully cured and in a second curing stage during which the adhesion promoter is also activated, preferably performed with the partially cured elastomer composition in contact with at least one substrate such as metal, the elastomer composition is at least substantially fully cured (i.e., a "two-step cure"). Because the adhesion promoters of the present invention do not appear to affect the crosslinking of the elastomer as do the adhesive adjuvants described in that patent, the retained compression after a two-step cure process wherein the elastomer is only partially cured will still be higher than for the compositions described in that patent.

In another embodiment, the compositions may be advantageously used in the confined cure method of U.S. Pat. No. 2,409,759 to Hosking, which is hereby incorporated herein by reference in its entirety. Thus, a partially or fully cured, fully formed elastomer part may be bonded to a metal part by confining the elastomer and the metal part in a second mold and applying heat and hydrostatic pressure sufficient to activate the adhesion promoter and bond the elastomer to the metal. The inventive compositions and adhesion promoters described herein advantageously provide bonding to ferrous metals and other metals and materials and do not require the polishing, cleaning and other tedious process steps described in that patent. However, it should be understood that this method may not resolve the shrinkage issue in articles where the elastomer needs to be between two metal parts in a state of compression. At best the elastomer element will be in a neutral state upon removal from a confining mold.

In yet another embodiment, the compositions described herein may advantageously be combined with the method of co-pending U.S. application Ser. No. 12/340,864 filed Dec. 22, 2008, which is hereby incorporated herein by reference in its entirety. Thus, the elastomeric composition may also include a blowing agent having an activation temperature that is above the temperature at which the elastomer part is cured and formed. After the elastomeric member is assembled into the gap between two substrates, preferably which may place the elastomeric member in a state of compression in the gap, the elastomeric member is then expanded by subjecting it to a temperature at or above the activation temperature of the blowing agent. During the expansion of the elastomeric member, the escape of gas produced by the blowing agent should be limited in order to realize an advantageous increase in the state of compression of the elastomeric member in the gap. The gas escape may be limited by placing a barrier surface, such as a metal plate, near or against one or each free surface of the assembled elastomeric member, or by the presence of a platy filler in the elastomer composition. The platy filler may be nanoclay, mica, flake graphite, glass flake, or the like, to increase the diffusion distance and thus reduce escape of gas from the expanding composition. As a result of gas pressure within many small bubbles in the elastomer, the force or pressure exerted by the elastomeric member against the structural member may be advantageously increased. The activation of the adhesion promoter may be carried out at the same time and at the same temperature conditions as the activation of the blowing agent, or the two effects (i.e., adhesion and expansion) may be activated in separate steps at different conditions and/or by different means of activation as described herein.

In another embodiment, special adhesion promoting additives may be chosen so that they migrate to the surface of the elastomer upon being heated in an oven. This will optimize the bonding strength and reduce the total amount of additives needed in the mix.

In other embodiments, the adhesive additive or additives may be chemically activated or chemically plus heat activated. Such additives could react with an assembly lubricant or with an additive to a lubricant, or in a separate step before or after the application of the lubricant. Acids, alkalines, alcohols, or other chemicals in gas, liquid, or solid form could be used for activation. Upon exposure to activating chemicals, the adhesion-promoting ingredients added to the elastomer mix present on the surface will be activated and create an adhesive that bonds to the metal surface.

In addition to chemical bonding, mechanical bonding may also be created by small particles on the surface exploding to create rough edges creating a surface similar to a sand paper which would result in mechanical bonding under the high compression of the elastomer.

Another possibility is creating micro or nano cavities (holes, pockets) on the surface of the elastomer that can trap bonding agents and adhesives and be released after assembly to create the metal-elastomer bonding.

In brief, this self-bonding elastomer includes its own bonding agent within it. The bonding agent does not harm the integrity of the elastomer, and when needed it can be activated to create bonding with metals, ceramics, or other materials. The bonding material can be mixed in particle sizes from millimeter to nanometer or any size in between. A preferred size may be from around micro- to nano-meter dimensions.

Dampers can also be assembled using various friction-enhancing substances on the rim surfaces or in the assembly lubricant.

EXAMPLES

In a series of examples, an embodiment of the invention is compared to the two-step cure of U.S. Pat. No. 7,291,241. Thus, the comparative example utilizes an elastomer composition with a metal adhesive adjuvant which is also a peroxide cure coagent, zinc dimethacrylate, as indicated in Table 1. The comparative example also has two peroxide curatives to facilitate the two cure steps. The inventive examples (Ex. 1-5) only require a single peroxide curative and use the Capow NZ 12/H adhesion promoter instead of a coagent, as also indicated in Table 1. In both the comparative case and the inventive examples, rubber rings of approximately 5 mm thickness were molded and assembled into a torsional vibration damper, like the one illustrated in FIG. 2, having a gap of approximate thickness 3.5 mm. Thus, the initial state of compression was approximately 30%. The Comparative rings were molded and partially cured for 70 seconds at 160° C. and the inventive ring examples were molded for 80 seconds at 170° C., followed by a post cure to substantially fully cure them. Two dampers of each of Ex. 2-5 and the comparative example were cut up to remove the rubber ring and check the amount of linear spring back. Five pieces were measured and averaged to obtain a single spring back percentage as indicated in Table 1 for each of the two dampers of each variable. As can be seen, the spring back of the inventive examples is approximately twice as high as that of the comparative example. It is also noticeable that the torque to turn, which indicates the adhesion level, increases with amount of adhesion promoter, but the spring back is relatively independent of the amount of adhesion promoter. This is believed to indicate that the adhesion promoter does not significantly interfere with the crosslinking or cure of the elastomer. It was also observed that cure rates, measured on a conventional moving die rheometer, indicated no significant dependence on adhesion promoter level. However, it was noticed that at the 10-15 phr level of adhesion promoter, the modulus of the elastomer was increased and the elongation decreased, which is believed due to the adhesion promoter acting as a coupling agent between the carbon black filler and the EPDM elastomer. Thus, the inventive approach can enhance elastomer properties while improving adhesion and retained compression.

TABLE 1

|  | Comp. Ex. | Ex. 1 | Ex. 2 | Ex. 3 | Ex. 4 | Ex. 5 |
| --- | --- | --- | --- | --- | --- | --- |
| Royalene 4697[1] | 200 | 200 | 200 | 200 | 200 | 200 |
| N293 Carbon black | 20 | 20 | 30 | 30 | 30 | 30 |
| N550 Carbon black | 50 | 50 | 60 | 60 | 60 | 60 |
| Paraffinic Oil | 5.9 | 5.9 | 5.9 | 5.9 | 5.9 | 5.9 |
| Zinc Oxide | 5 | 5 | 5 | 5 | 5 | 5 |
| Zinc Stearate | 1.5 | 1.5 | 1.5 | 1.5 | 1.5 | 1.5 |
| Triethanolamine | 1 | 1 | 1 | 1 | 1 | 1 |
| Antioxidant[2] | 1.5 | 1.5 | 1.5 | 1.5 | 1.5 | 1.5 |
| Paraffinic Oil | 5.9 | 5.9 | 5.9 | 5.9 | 5.9 | 5.9 |
| Zinc dimethacrylate | 33 | — | — | — | — | — |
| HVA-2[3] | 1 | 1 | 1 | 1 | 1 | 1 |
| Varox 130XL[4] | 1 | — | — | — | — | — |
| Varox 231XL[5] | 7 | 7 | 7 | 7 | 7 | 7 |
| Capow NZ 12/H | — | 5 | 3 | 5 | 10 | 15 |
| Cure rate (t90 on MDR) (min.) |  | 1.57 | 1.37 | 1.29 | 1.38 | 1.45 |
| Tensile modulus at 50% elongation (psi) |  | 82 | 92 | 89 | 117 | 124 |
| spring-back (% swell) | 10.1 | — | 20.1 | 19.9 | 18.1 | 17.7 |
| spring-back (% swell) | 8.9 | — | 20.3 | 21.6 | 20.1 | 18.6 |
| Torque to turn (ft-lbs) | 3150 | 2835 | 720 | 1080 | 2520 | 3020 |

[1]EPDM with 100 parts paraffinic process oil, from Lion Copolymer, LLC.
[2]Polymerized 1,2-dihydro-2,2,4-trimethylquinoline.
[3]N,N' m-phenylenedimaleimide, from Sartomer Company.
[4]2,5-dimethyl-2,5-di-(t-butylperoxy)-3-hexyne, from R. T. Vanderbilt Co., Inc.
[5]1,1-di-(t-butylperoxy)-3,3,5-trimethylcyclohexane, from R. T. Vanderbilt Co., Inc.

The torque to turn result for Ex. 1 in Table 1 of 2835 ft-lbs. represents an average of 4 parts. A fifth part according to Ex. 1 was then assembled 4 weeks after forming the elastomer element in order to explore the shelf life of the elastomer element. The torque to turn result for this fifth part was 1026 ft-lbs, indicating a reasonably long shelf life. A number of additional dampers were assembled according to Ex. 1 and subjected to a variety of accelerated durability tests, after which the torque to turn test was carried out. Thus, after 40 hours of torsional vibration durability testing, the torque to turn was 2424 ft-lbs, and after 4 weeks of torsional vibration durability testing, the torque to turn was 732 ft-lbs, indicating good durability to vibrations in use. Two dampers subjected to 48 hours of heat aging at 130° C. exhibited torque to turn values of 1259 and 782 ft-lbs, respectively, indicating good resistance to heat.

Thus, embodiments of the invention provide an elastomer that can bond to metals and other surfaces without a separate bonding agent (i.e., with no adhesive layers, glue, etc.) while maintaining its state of compression (i.e., with almost no loss of compression). Compared to prior art methods, embodiments of the invention can provide improved bonding strength, improved elastomer durability, improved cost, and improved simplicity of the processing. However, there are other advantages that are worthy of mention. The fully cured molded elastomer of the invention does not require the careful packaging (e.g. sealed plastic bags and/or cold room storage) which was required of the partially cured rubber of the prior art. Likewise, the molded elastomer of the invention does not have the problem of relatively short shelf life like the partially cured rubber of the prior art. The molded elastomer of the invention does not have to be cooled in any special fashion after the molding, whereas the prior art partial cure required quick cooling to prevent over-cure. Overall, the molding of the elastomer of the invention is much easier and has much less scrap, since the adhesion promoter does not cause as severe sticking to the metal mold as did the adhesive adjuvants of the prior art. Likewise, the inventive process does not require such careful control of the state of cure as in the two-step process of the prior art.

All of the above, result in a process with more robust production, lower cost, and lower scrap. Furthermore, the inventive method adds to the flexibility of production scheduling and logistics. For instance, the molded elastomer of the invention could be made in one region of the world and be shipped to various other regions without requiring refrigerated containers and/or a very short transport time. The entire time from molding to assembly has typically been a maximum of about 2 weeks for the prior art two-step cure, while it is at least several months, if not higher for the inventive rubber elements and articles.

Embodiments of the invention can find useful application in many automotive and non-automotive product applications. As nonlimiting examples, applications include crankshaft dampers, cam dampers, shaft dampers, isolators, decouplers, and many other industrial, agricultural, automotive, and other applications where elastomers are bonded to metals and other materials.

Although the present invention and its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A composite article comprising at least one structural member and a substantially fully-cured elastomer member self-bonded to said structural member; said elastomer member comprising the substantially fully-cured reaction product of:
   at least one elastomeric polymer component, and
   at least one curative component at a cure temperature, and further comprising
   at least one adhesion promoter having an activation temperature above said cure temperature and which upon activation resulted in said self-bonding between said structural member and said fully-cured elastomer member;
   wherein said reaction product comprises 3 to 50 parts by weight of said adhesion promoter based on 100 parts by weight of said elastomeric polymer component.

2. The article of claim 1 wherein said structural member comprises metal, and said at least one adhesion promoter is a metal adhesion promoter selected from the group consisting of neoalkoxy zirconates and polyimides.

3. The article of claim 2 wherein said adhesion promoter is a neoalkoxy zirconate with at least one organo-phosphate group.

4. The article of claim 3 wherein said neoalkoxy zirconate is neopentyl-diallyl-oxy tri-dioctylphosphato zirconate.

5. The article of claim 4 wherein said reaction product comprises 3 to 50 parts by weight of said adhesion promoter based on 100 parts by weight of said elastomeric polymer component.

6. The article of claim 5 wherein said at least one elastomeric polymer component comprises an EPDM elastomer.

7. The article of claim 3 wherein said reaction product comprises 3 to 50 parts by weight of said adhesion promoter based on 100 parts by weight of said elastomeric polymer component.

8. The article of claim 7 wherein said at least one elastomeric polymer component comprises an ethylene-propylene elastomer.

9. The article of claim 8 wherein said at least one curative component is a peroxide curative.

10. The article of claim 2 wherein said reaction product comprises 3 to 50 parts by weight of said adhesion promoter based on 100 parts by weight of said elastomeric polymer component.

11. The article of claim 2 wherein said at least one adhesion promoter is a polyimide powder.

12. The article of claim 1 wherein said reaction product further comprises silicon dioxide in an amount equal to 40% to 60% of the amount of said adhesion promoter.

13. The article of claim 1 wherein said reaction product further comprises silicon dioxide in an amount equal to about half of the amount of said adhesion promoter.

14. The article of claim 1 comprising at least two structural members, and wherein said elastomer member resides between said two structural members and is bonded to at least one said structural member in the absence of an adhesive coating between said elastomer member and said at least one said structural member.

15. The article of claim 1 wherein said structural member comprises metal, and said adhesion promoter is a metal adhesion promoter.

16. The article of claim 15 wherein said metal is ferrous metal.

17. The article of claim 1 wherein said substantially fully-cured elastomer member is a fully-cured elastomer member.

18. The article of claim 1 in the form of a vibration damper, vibration absorber or vibration isolator.

19. The article of claim 1 wherein the elastomer resides in a state of compression between two said structural members and is bonded to said two structural members in the absence of an adhesive coating between said structural members and said elastomer member.

20. A method of making the composite article of claim 1 comprising:

(a) mixing an elastomer composition comprising the at least one elastomeric polymer component, the at least one curative component and the at least one adhesion promoter having an activation temperature above said cure temperature of said curative component;

(b) forming said substantially fully-cured elastomer member from said elastomer composition at said cure temperature;

(c) pressing said formed elastomer member against the at least one structural member; and (d) activating said adhesion promoter at said activation temperature above said cure temperature resulting in said self-bonding between said fully-cured elastomer member and said structural member.

21. The method of claim 20 wherein said forming comprises fully curing said elastomer member.

22. The method of claim 21 wherein said activating results in a bond between said elastomer member and said rigid member in the absence of any adhesive coating between said elastomer member and said rigid member.

23. The method of claim 22 wherein said promoter is a neoalkoxy zirconate with an organo-phosphate group.

24. The method of claim 23 wherein said neoalkoxy zirconate is neopentyl-diallyl-oxy tri-dioctylphosphato zirconate.

25. The method of claim 20 wherein said elastomer composition comprises 100 parts by weight of said at least one elastomeric polymer component, and from 3 to 50 parts of said at least one adhesion promoter selected from the group consisting of neoalkoxy zirconates and polyimides.

26. The method of claim 25 wherein said adhesion promoter is a neoalkoxy zirconate with an organo-phosphate group.

27. The method of claim 26 wherein said neoalkoxy zirconate is neopentyl-diallyl-oxy tri-dioctylphosphato zirconate.

28. The method of claim 27 wherein said elastomer composition further comprises silicon dioxide in an amount equal to 40% to 60% of the amount of said adhesion promoter.

29. The method of claim 25 wherein said elastomer composition further comprises silicon dioxide in an amount equal to about half of the amount of said adhesion promoter.

30. The method of claim 20 wherein said at least one adhesion promoter is a polyimide powder.

* * * * *